W. B. BLAND.
PLANTER.
APPLICATION FILED JULY 20, 1916.

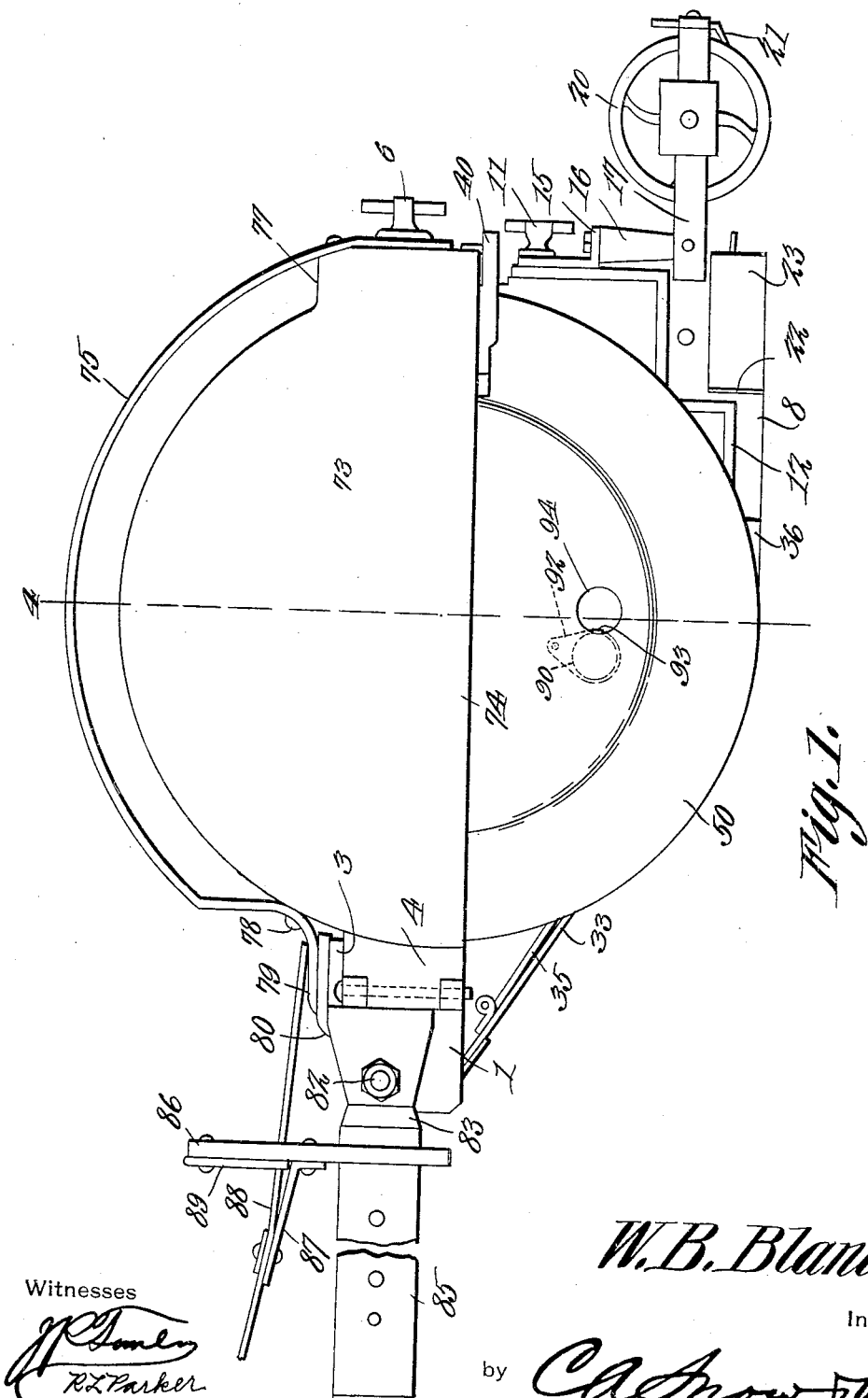

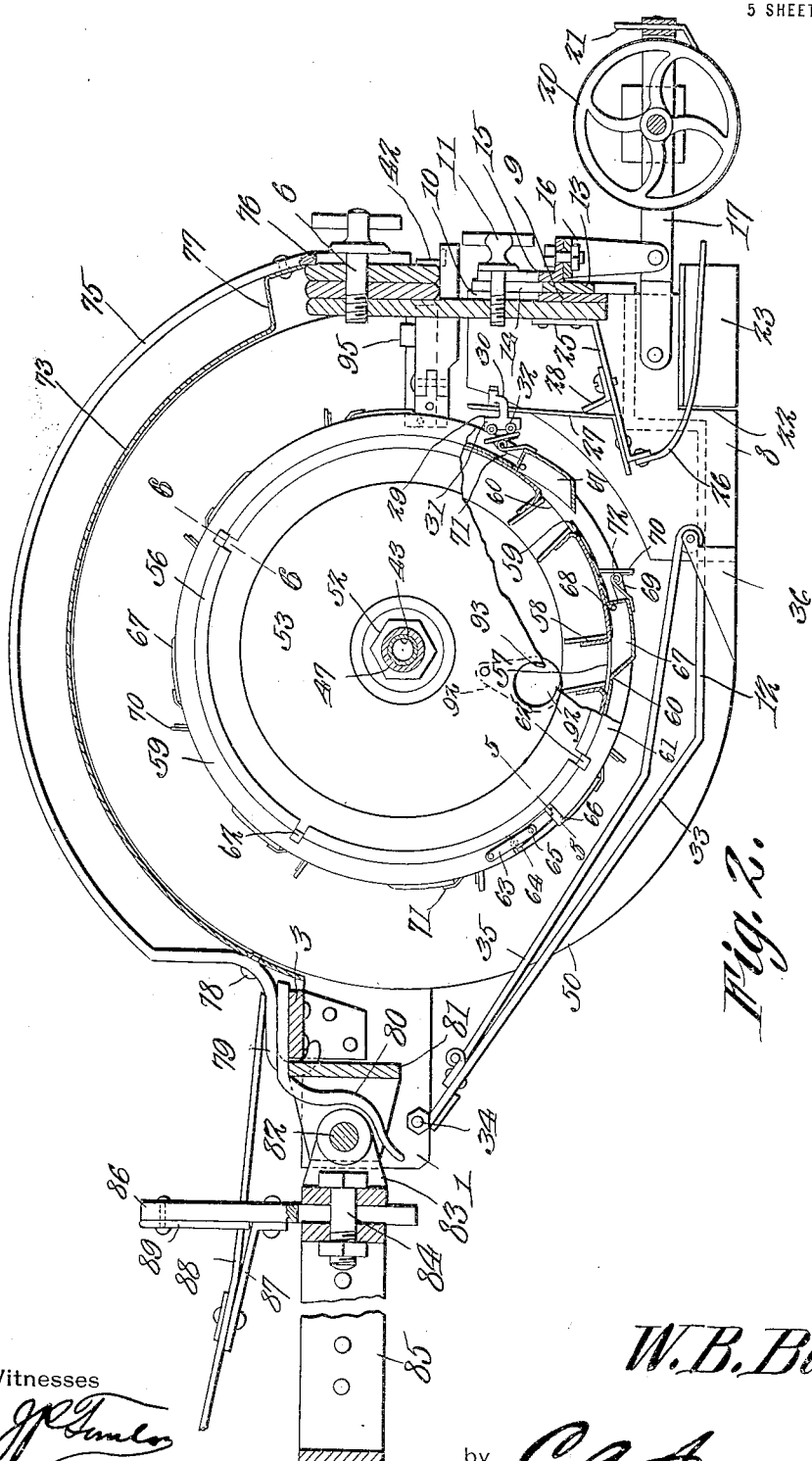

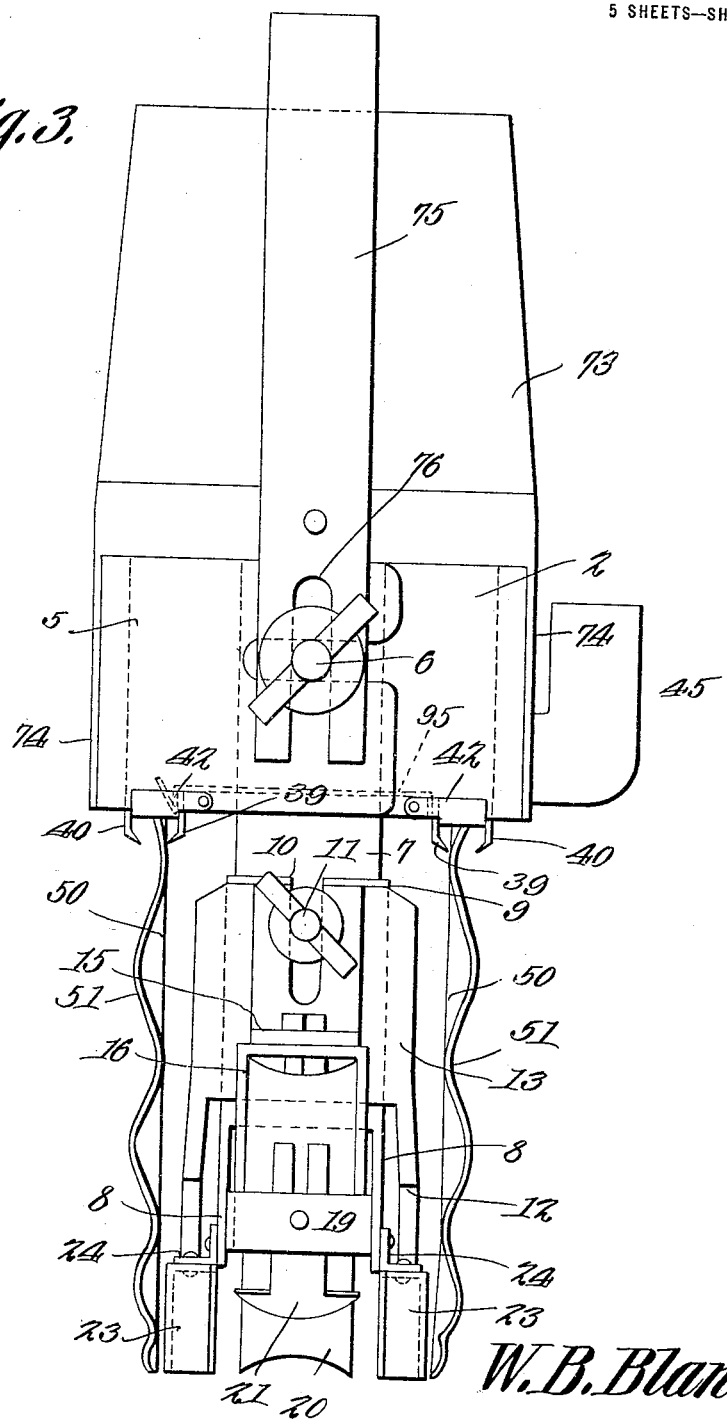

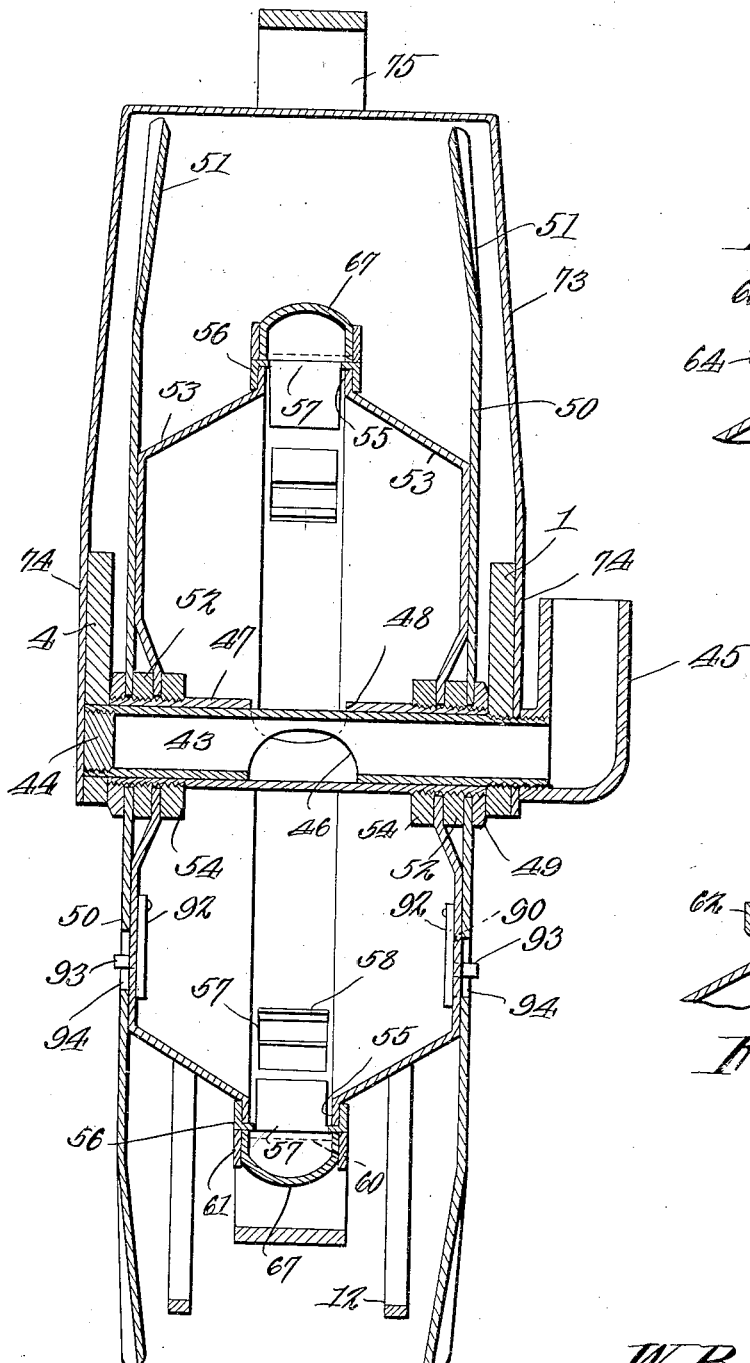

1,231,558.

Patented July 3, 1917.
5 SHEETS—SHEET 5.

W. B. Bland

Witnesses

Inventor,
by C. A. Snow & Co.
Attorneys.

UNITED STATES PATENT OFFICE.

WILLIAM BURDINE BLAND, OF JENKS, OKLAHOMA.

PLANTER.

1,231,558.    Specification of Letters Patent.    Patented July 3, 1917.

Application filed July 20, 1916. Serial No. 110,262.

*To all whom it may concern:*

Be it known that I, WILLIAM B. BLAND, a citizen of the United States, residing at Jenks, in the county of Tulsa and State of Oklahoma, have invented a new and useful Planter, of which the following is a specification.

This invention relates to planters, one of its objects being to provide a simple and compact structure which can be cheaply formed of sheet metal and placed upon the market at a low price, the machine being of a type in which the seed container is designed to rotate, this container being provided with dropping means of novel form by means of which the seeds will be deposited at desired distances apart into the furrow.

A further object is to provide adjustable means whereby the number of seeds deposited in each hill can be regulated.

Another object is to provide a novel arrangement of furrow opener and seed coverer.

A still further object is to provide improved means whereby the revoluble container of the planter may be provided with a supply of seeds.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the planter.

Fig. 2 is a vertical longitudinal section therethrough.

Fig. 3 is a rear elevation.

Fig. 4 is an enlarged transverse section through the machine, said section being taken on the line 4—4 Fig. 1.

Fig. 5 is an enlarged section on line 5—5 Fig. 2.

Fig. 6 is an enlarged section on line 6—6 Fig. 2.

Figure 7:
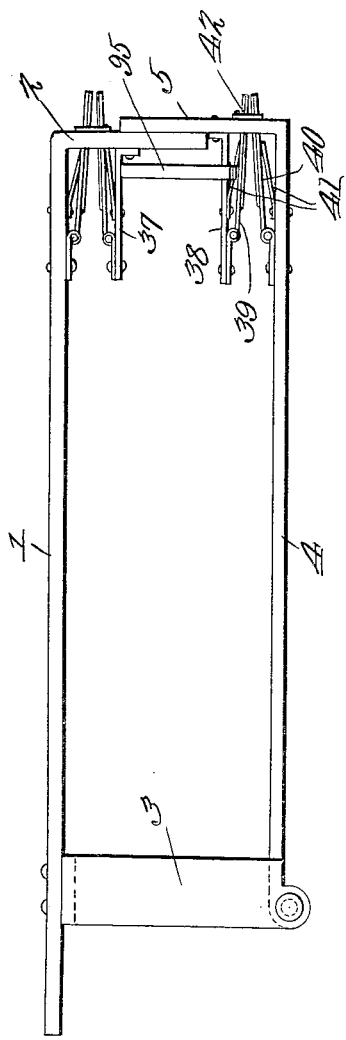
Fig. 7 is a plan view of a portion of the planter structure and showing the scraping means employed.

Referring to the figures by characters of reference 1 designates one of the side strips of the main frame the rear end of which is turned at right angles as indicated at 2. Secured to the front end portion of this side strip 1 is a front strip 3 to which is hingedly connected the front end of a side strip 4 the rear end of which is bent laterally as at 5 so as to lap the portion 2 hereinbefore referred to. The two lapping portions are held together by a clamping screw 6 which, as shown in Fig. 2, is threaded into a hanger 7. This hanger extends between side or guard plates 8 connected by a cross plate 9 which is slotted as at 10 for the reception of a clamping screw 11. Draw bars 12 are extended along the outer sides of the plates 8 and merge into a back plate 13 which bears against the plate 9 and is slotted, as at 14, for the reception of the clamping screw 11.

A slotted bracket 15 is clamped to the plate 13 by the screw 11 and connected to and depending from this bracket is a yoke 16 the lower end of which is attached to side bars 17 pivotally connected at their forward ends to the inner sides of the plates 8, as indicated at 18. These side bars 17 are connected at their rear ends, as shown at 19, so as thus to form a frame and journaled within the frame is a covering wheel 20 while adjustably connected to the back portion 19 of the frame is a scraping blade 21 engaging the periphery of the wheel.

Figure 8:
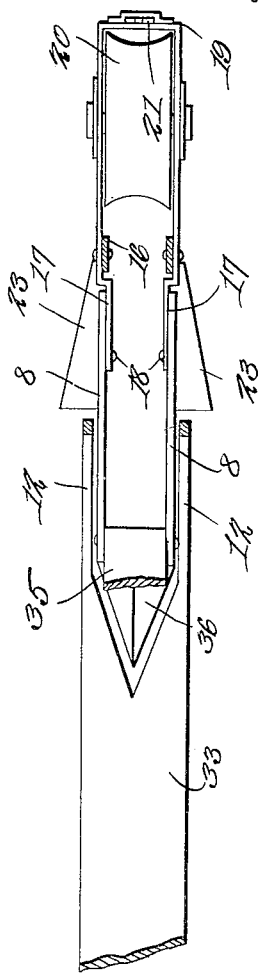
Fig. 8 is a plan view of the furrow opener and adjacent parts.

The rear portions of the side plates 8 are cut away at the lower edges thereof as indicated at 22 and arranged outside of these cut away portions are covering blades 23 the upper edges of which are secured to brackets 24 outstanding from the sides of the plates 8. These covering blades are obliquely disposed as shown particularly in Fig. 8.

Extending forwardly from the lower portion of the hanger 7 is an arm 25 to the forward end of which is secured a gage 26 in the form of an elongated downwardly and rearwardly curved strip extending between the covering blades 23. A spring 27 extends upwardly from the arm 25 and is reinforced by a stop bracket 28 secured on the arm 25. Adjustably mounted upon this spring so as to be moved to a desired elevation, is a trip 29 consisting of a sleeve 30 which is adjustably mounted on the spring and a block 31 carried by the sleeve and having rollers or other anti-friction devices 32 on the front face thereof.

The draw bars 12 are formed integral with a strip 33 which extends upwardly and forwardly and is secured in any suitable manner to the front end portion of the side strip 1, as shown at 34. Pivotally connected to the front end portion of this strip 33 is a draw bar 35 which extends rearwardly and is pivotally connected to a furrow opener 36 interposed between and extending forwardly from the side plates 8.

Extending forwardly from the inturned portion 2 of strip 1 is an arm 37 and another similar arm 38 is extended forwardly from the inturned end portion 5 of the strip 4. Hingedly connected to these arms are scraping blades 39 and additional scraping blades 40 are hingedly connected to the respective strips 1 and 4, the strips or blades 39 and 40 being oppositely disposed and being arranged in pairs. Springs 41 bear against the strips 39 and 40 and serve to hold them normally pressed toward each other. The said strips, which constitute scrapers, can if desired be held apart by lowering a pivoted spacing plate 42 into position between the scraping blades of each pair.

Secured within the side strips 1 and 4 is a tubular bearing member 43 one end of which is flush with the outer face of the strip 4 and is closed by a screw plug 44, while the other end projects beyond the side strip 1 and is engaged by an upwardly extending tubular filling member 45. The tubular bearing member 43 has an opening 46 extending partly therearound at the center thereof.

Mounted for rotation on the bearing member 43 is a sleeve 47 provided, between its ends, with an opening 48 extending partly therearound, which opening is designed to intermittently register with the opening 46 during the rotation of the sleeve on the bearing member 43. The ends of the bearing member are screw threaded and bear against the inner sides of the strips 1 and 4. Mounted on each end portion of the sleeve is a nut 49 and bearing outwardly against these nuts are disks 50 preferably formed of sheet metal and the peripheral portions of which slightly converge toward each other and are provided with radial corrugations, as indicated at 51. These disks 50 are held close to the nuts 49 by holding nuts 52 engaging the sleeve 47.

Opposed dished members 53 are clamped against the nuts 52 by nuts 54, the sides of these members 53 being provided with central recesses for the reception of the nuts 52 and whereby said dished members are permitted to bear against the inner faces of the disks 50. The outwardly converging marginal portions of the dished members 53 are provided with annular flanges 55. These flanges are straddled by a channeled ring 56, the flanges of the ring engaging the outer sides of the flanges 55 and thus holding the marginal portions of the dished members together to form a seed container. Ring 56 is provided at regular intervals with outlet openings 57 and blades 58 are extended inwardly from opposed walls of each opening.

Clamped about the ring 56 is a band 59 provided at regular intervals with openings 60 designed to be moved into or out of registration with the openings 57. Band 59 has outstanding longitudinal flanges 61 at the sides thereof and said band is held against lateral displacement relative to the ring 56 by ears 62 struck from the flanges of the ring 56 and bent outwardly as shown particularly in Fig. 2. The ends of the band do not come together but, instead, links 63 are pivotally connected to one end of the band while additional links 64 are pivotally connected to the other end of the band. Links 63, in turn, are pivotally connected to the links 64 at points between the ends thereof, as shown at 65 and the free ends of the links 64 are connected by a double yoke 66 shown particularly in Fig. 5 and which is designed to fit snugly between the flanges 61 and to straddle said flanges, thus to hold the pivot 65 past its dead center and maintain the band 59 clamped about the ring 56. When it is desired to adjust the band 59 relative to the ring 56, it merely becomes necessary to swing the double yoke 66 outwardly, thus to allow the ends of the band to move apart. As the band is thus loosened on the ring 56, said band can be shifted so as to move its openings 60 and thus partly or entirely close the openings 57. After the desired adjustment has been effected, the yoke 66 can be shifted back against the band 59 and thus bind said band on the ring 56.

Pivotally mounted between the flanges 61 of band 59 are buckets 67 which normally extend across the openings 60 in the band. Each bucket is pivotally mounted at one end and close to the band as indicated at 68 in Fig. 2. Extending from said end of each bucket is an arm 69 and pivotally connected to the free end of each arm is a latch member in the form of a plate 70. A spring 71 is mounted on the pivot 72 of each plate and bears at one end against the adjacent bucket 67 and at its other end against the plate 70 so as thus to hold said plate normally pressed against the band 59, thus to hold the bucket 67 likewise pressed against the band and across the adjacent opening 57.

For the purpose of covering the seed container a hood 73 is provided. This hood is concentric with the container and with the disks 50 and has side wings 74 which lap the outer faces of the strips 1 and 4. A handle 75 extends along the top of the hood and has its rear end forked as at 76 so as to be engaged by the screw 6. The rear end portion of the handle is connected to the hood by a strap 77. The front end portion of the handle is bent down to the hood and held thereto by rivets or in any other suitable manner, as indicated at 78 and this handle merges at its front end into a hooked projection 79 adapted to engage the front edge of the cross strip 3.

Secured upon the cross strip 3 and curved downwardly and forwardly therefrom is a spring tongue 80 which extends downwardly through a clip 81 in which is arranged a pivot member 82 under which the tongue 80 projects. Mounted on this pivot member is a clip 83 connected, by a bolt 84, to a clip 85 designed to be secured in any desired manner to a tongue, draft bar or the like not shown. A post 86 having a slotted lower end, is extended between the clips 83 and 85 and is clamped thereagainst by the bolt 84. An arm 87 is extended forwardly from the post and has secured to it a spring tongue 88 which bears downwardly on the hooked terminal 79. A latch 89 is designed to overhang the spring 88 and thus increase the stiffness of the spring so that the clip 85 will be yieldingly supported. The tongue 80 obviously constitutes an efficient connection between the strip 81 and strip 3, while the spring 88 serves as a yieldable support for the clips 83 and 85.

In using the planter the seed container is rotated until the opening 48 in sleeve 47 registers with the opening 46. Seeds are then poured through the tubular member 45 and will obviously flow into the container. After the band 59 has been adjusted so as to regulate the size of the orifices through which the seeds can escape, the machine is moved forward. The corrugated peripheries of the disks 50 will engage the soil and be rotated after the manner of wheels, causing the seed container also to rotate. During the rotation of the seed container, the latch members or plates 70, which serve normally to hold the buckets 67 in closed positions, will be brought successively against the antifriction rollers 32 and be swung against the action of their springs 71, thus causing the arms 69 to be pressed inwardly toward the band 59 and causing the buckets 67 to be successively tilted away from the band 59 so as to discharge the contents of the buckets. These buckets are obviously filled when brought to their lowermost positions by seeds flowing through the openings 57 and 60 and between the blades 58. When the buckets are tilted to discharge their contents, the seeds will drop back of the furrow opener 36 and between the side plates 8 after which they will be covered by loosened soil directed thereover by the covering blades 23. This soil will be pressed downwardly by the spring gage 26 and the hill will subsequently be rounded by the wheel 20.

The seed container can be removed readily from the machine simply by loosening the screw 6 so as to permit the hood 73 to be lifted out of position and permit the lapping ends 5 and 2 to be disengaged. Side strip 4 can then be swung laterally off of the end of the bearing member 43, after which the sleeve 47 and the parts carried thereby can be slipped off of the bearing member.

Each of the dished members 53 is provided with an opening 90 having a recess in the wall thereof as shown at 91. Pivotally connected to each of the members 53 so as to engage the inner face thereof and normally close the opening 90 is a closure having a coupling finger 93 which is normally seated in the recess 91 and extends through an opening 94 formed in the adjacent disk 50. Thus it will be seen that when the disks 50 are rolling forwardly, the walls of the opening 94 will press against the finger 93 and cause them to be seated in the recesses 91, thereby holding the closures 92 in shut positions and coupling the disks 50 to the members 53. However, by revolving the disks 50 in the opposite directions, they will move away from the fingers 93 and thus permit said fingers to swing out of the recesses 91. Consequently the closures 92 will move to expose the openings 90. Thus small seeds can be placed in the container.

If desired a spring latch 95 can be connected to one of the arms 37 so as to engage the other arm 38 when the inturned portions 2 and 5 are in lapped position, this spring latch serving to hold the parts against accidental separation while the other parts of the machine are being adjusted.

Arrows may be placed at suitable intervals upon the parts 56 and 59 and when brought to register will indicate the number of hills that will be dropped during one revolution of the container. These arrows or other indicators can be suitably designated by numerals.

What is claimed is:—

1. In a planter, the combination with hingedly connected side strips and a tubular bearing member fixedly attached to one of the side strips and detachably engaged by the other side strip, of a revoluble seed container mounted for rotation on and detachable from the bearing member, ground engaging disks at the sides of and revoluble with the seed container, means for intermittently discharging seeds from the peripheral portion of the seed container, and means for feeding seeds into the bearing member, said bearing member having an outlet into the seed container.

2. A planter including a revoluble seed container having peripheral openings constituting seed outlets, buckets pivotally connected to the peripheral portion of the container, a latch member pivotally connected to each bucket for engaging the peripheral portion of the container to hold the bucket in closed position, a tripping element in the path of the latch member for successive engagement by said member to shift the latch members out of their normal positions and tilt the buckets away from the peripheral portion of the container, and means for automatically returning the buckets and the latch members to their initial positions when released from the tripping element.

3. A planter including a revoluble seed container having peripheral outlet openings, a ground engaging device revoluble with the container, a band adjustable along the periphery of the container and having openings adapted to register with the container openings, said band being adjustable to vary the size of the outlets for the seeds in the container, buckets carried by the band and normally closing the openings therein, means connected to the buckets and coöperating with the band for holding the buckets in closed positions across the openings, tripping means for engagement by the holding means to release the buckets and shift them to discharging positions when moving past a given point, and means for automatically returning the buckets and their holding means to their normal positions.

4. A planter including a revoluble container having peripheral openings, a ground engaging device revoluble therewith, an apertured band adjustable along the periphery of the container for varying the size of the openings, buckets carried by the band, means connected to the buckets and coöperating with the band for holding the buckets in closed positions across the openings, a yieldingly supported tripping device in the path of said means for successively shifting said means to move the buckets to open positions, means within the container and adjacent the openings for preventing the outflow of seeds from the container while the buckets are in open positions, and means for automatically returning the buckets to their closed positions.

5. In a planter, a seed container including opposed dished members having peripheral flanges, a channeled ring straddling the flanges, said ring having openings therein, a band extending along the ring and having openings designed to register with the openings in the ring, means for drawing the ends of the band toward each other to bind the band upon the ring, buckets pivotally connected to the band, and means connected to each bucket and coöperating with the band for holding the bucket in position across the opening in the band, and yielding means for maintaining each bucket and its holding means in normal position.

6. In a planter, the combination with a seed container having peripheral openings, and means for controlling the discharge of seeds through the openings, of ground engaging disks revoluble with the container, each disk having radial corrugations, scraping members arranged in pairs, each disk being extended between the members of each pair, and yielding means for holding said members pressed against the disk.

7. In a planter, a seed container mounted for rotation and including opposed dished members, a peripheral ring connecting the members and having outlet openings, means for controlling the discharge of seeds through the openings, a sleeve connecting the dished members at their centers, said sleeve having an intermediate opening, a tubular bearing member extending through the sleeve, said bearing member having an intermediate opening, and a tubular feed extension opening into one end of the bearing member.

In testimony that I claim the foregoing as my own, I have hereto affixed my signature in the presence of two witnesses.

WILLIAM BURDINE BLAND.

Witnesses:
W. W. YEAGER,
L. E. MYLES.

Copies of this patent may be obtained for five cents each, by addressing the "Commissioner of Patents, Washington, D. C."